United States Patent
McNabney et al.

(10) Patent No.: US 11,126,665 B1
(45) Date of Patent: Sep. 21, 2021

(54) MAINTAINING DASHBOARD STATE

(71) Applicant: MicroStrategy Incorporated, Vienna, VA (US)

(72) Inventors: Chris McNabney, Reston, VA (US); Shrimohan Damani, South Riding, VA (US); Ellen Wang, Great Falls, VA (US); Aaditya Narvekar, Vienna, VA (US)

(73) Assignee: MicroStrategy Incorporated, Vienna, VA (US)

( * ) Notice: Subject to any disclaimer, the term of this patent is extended or adjusted under 35 U.S.C. 154(b) by 165 days.

(21) Appl. No.: 15/956,546

(22) Filed: Apr. 18, 2018

Related U.S. Application Data

(60) Provisional application No. 62/486,610, filed on Apr. 18, 2017.

(51) Int. Cl.
  G06F 16/904 (2019.01)

(52) U.S. Cl.
  CPC .................................. G06F 16/904 (2019.01)

(58) Field of Classification Search
  CPC ... G06F 16/904; G06F 3/0482; G06F 3/04847
  USPC ......................................................... 703/736
  See application file for complete search history.

(56) References Cited

U.S. PATENT DOCUMENTS

| | | | |
|---|---|---|---|
| 7,949,706 B2 | 5/2011 | Malik | |
| 8,516,046 B1 | 8/2013 | Xu | |
| 9,276,749 B2 | 3/2016 | Tenenboym et al. | |
| 9,774,561 B1 | 9/2017 | Rapp et al. | |
| 10,366,079 B1* | 7/2019 | Xiao | G06Q 30/0269 |
| 2003/0080998 A1 | 5/2003 | Gonzalez | |
| 2004/0205453 A1 | 10/2004 | Mortensen | |
| 2006/0015818 A1* | 1/2006 | Chaudhri | G06F 3/048 |
| | | | 715/779 |
| 2008/0010378 A1 | 1/2008 | Parker et al. | |
| 2008/0034314 A1* | 2/2008 | Louch | G06F 3/0481 |
| | | | 715/778 |
| 2008/0177782 A1 | 7/2008 | Poston et al. | |

(Continued)

OTHER PUBLICATIONS

U.S. Office Action in U.S. Appl. No. 15/427,874, dated Apr. 17, 2020, 16 pages.

(Continued)

*Primary Examiner* — Brittany N Allen
*Assistant Examiner* — Jessica N Le
(74) *Attorney, Agent, or Firm* — Fish & Richardson P.C.

(57) ABSTRACT

Methods, systems, and apparatus, including computer programs encoded on a computer storage medium, for maintaining dashboard state are disclosed. In one aspect, a method includes the actions of accessing data identifying modifications that the user has previously applied to the dashboard. The actions further include applying, to the dashboard, the modifications that the user has previously applied to the dashboard. The actions further include providing, to the client device, the modified dashboard. The actions further include receiving, from the client device, additional modifications applied by the user to the modified dashboard. The actions further include updating the modifications that the user previously applied to the dashboard without updating the dashboard by adding data identifying the additional modifications to the data identifying the modifications.

20 Claims, 7 Drawing Sheets

(56) References Cited

U.S. PATENT DOCUMENTS

| | | | |
|---|---|---|---|
| 2008/0209078 A1* | 8/2008 | Bates | G06Q 10/00 710/10 |
| 2009/0024944 A1* | 1/2009 | Louch | G06F 9/451 715/765 |
| 2010/0057646 A1* | 3/2010 | Martin | G16H 15/00 706/11 |
| 2010/0146385 A1 | 6/2010 | Goulandris | |
| 2010/0146640 A1 | 6/2010 | Wang et al. | |
| 2011/0126111 A1 | 5/2011 | Gill et al. | |
| 2012/0296697 A1 | 11/2012 | Kumar | |
| 2013/0110919 A1 | 5/2013 | An et al. | |
| 2013/0117400 A1 | 5/2013 | An et al. | |
| 2013/0139081 A1* | 5/2013 | Alon | G06Q 10/10 715/765 |
| 2013/0212151 A1 | 8/2013 | Herbach et al. | |
| 2013/0297588 A1 | 11/2013 | Tyagi | |
| 2014/0040257 A1* | 2/2014 | Chandrasekaran | G06F 16/972 707/736 |
| 2014/0067865 A1 | 3/2014 | Kirigin | |
| 2014/0081903 A1 | 3/2014 | Koosel | |
| 2014/0208215 A1* | 7/2014 | Deshpande | G06Q 10/00 715/736 |
| 2014/0227675 A1 | 8/2014 | Budhu | |
| 2014/0229543 A1 | 8/2014 | Allison et al. | |
| 2014/0337778 A1 | 11/2014 | Armitage | |
| 2014/0337808 A1 | 11/2014 | Armitage | |
| 2015/0134808 A1 | 5/2015 | Fushamn et al. | |
| 2015/0172234 A1 | 6/2015 | Triantos et al. | |
| 2016/0285818 A1 | 9/2016 | Beausoleil | |
| 2017/0011441 A1* | 1/2017 | Buezas | G06Q 30/0635 |
| 2017/0123397 A1* | 5/2017 | Billi | G05B 15/02 |
| 2017/0131856 A1 | 5/2017 | Reyes et al. | |
| 2017/0177608 A1 | 6/2017 | Cismas et al. | |
| 2017/0286549 A1 | 10/2017 | Chandnani et al. | |
| 2017/0300483 A1 | 10/2017 | DeVincenzi | |
| 2018/0173372 A1* | 6/2018 | Greenspan | G06F 16/2465 |
| 2018/0275845 A1* | 9/2018 | Barbee | G06F 3/0481 |
| 2020/0007644 A1* | 1/2020 | Carlson | H04L 67/06 |

OTHER PUBLICATIONS

U.S. Office Action in U.S. Appl. No. 15/427,874, dated Mar. 5, 2019, 17 pages.

U.S. Office Action in U.S. Appl. No. 15/427,874, dated Feb. 4, 2021, 20 pages.

* cited by examiner

FIG. 1A

MAINTAINING DASHBOARD STATE

CROSS-REFERENCE TO RELATED APPLICATION

This application claims the benefit of U.S. Provisional Application No. 62/486,610, filed Apr. 18, 2017, which is incorporated by reference.

TECHNICAL FIELD

This disclosure relates to data analytics.

BACKGROUND

Data Analytics is the discovery, interpretation, and communication of meaningful patterns in data. Especially valuable in areas rich with recorded information, analytics relies on the simultaneous application of statistics, computer programming and operations research to quantify performance.

SUMMARY

Techniques are described for providing continuity in a user's experience as a user moves from a computer to mobile environment while interacting and manipulating a document such as a dashboard. The system maintains state information for the document (e.g., structure of document, page you were looking at, sorting of data, filtering of data, etc.) and applies the state information the next time the user accesses the document. The state information allows the user to resume the experience with up to date data by applying the state information to current data. Additionally, techniques are described for storing instances of data analysis operations. The system provides an interface access and view for previous instances of documents and assembles deltas between each instance.

An innovative aspect of the subject matter described in this specification may be implemented in a method for maintaining dashboard state that includes receiving, from a client device and by a data analysis system, a request for a dashboard that displays a graphical representation of data stored and accessed by the data analysis system and data identifying a user; accessing data identifying modifications that the user has previously applied to the dashboard; applying, to the dashboard, the modifications that the user has previously applied to the dashboard; providing, to the client device, the modified dashboard; receiving, from the client device, additional modifications applied by the user to the modified dashboard; and updating the modifications that the user previously applied to the dashboard without updating the dashboard by adding data identifying the additional modifications to the data identifying the modifications.

These and other implementations can each optionally include one or more of the following features. The action of accessing data identifying modifications that the user has previously applied to the dashboard includes accessing data identifying filtering applied to the dashboard, rearranging elements of the dashboard, zooming applied to the elements of the dashboard, or selected settings of the dashboard. The actions further include receiving, from the client device, a request to apply a portion of the modifications that the user has previously applied to the dashboard. The action of accessing the data identifying the modifications that the user has previously applied to the dashboard includes accessing the portion of the modifications. The action of applying, to the dashboard, the modifications that the user has previously applied to the dashboard includes applying the portion of the modifications to the dashboard. The data identifying the modifications is a stack of multiple manipulations. The action of adding data identifying the additional modifications to the data identifying the modifications includes appending, to the stack of multiple manipulations, the data identifying the additional modifications. The action of adding data identifying the additional modifications to the data identifying the modifications includes generating an additional stack that includes the multiple manipulations and the additional manipulations. The action of applying, to the dashboard, the modifications that the user has previously applied to the dashboard includes determining that a particular modification of the modifications that the user has previously applied to the dashboard is not applicable to the dashboard; and applying, to the dashboard, the modifications other than the particular modification.

Other implementations of this aspect include corresponding systems, apparatus, and computer programs recorded on computer storage devices, each configured to perform the operations of the methods.

Particular implementations of the subject matter described in this specification can be implemented so as to realize one or more of the following advantages. Users may seamlessly switch between different devices while viewing a dashboard and the manipulations that the user has applied to the dashboard.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF DRAWINGS

FIGS. 1A and 1B illustrate example dashboards.

In the drawings, like reference numbers represent corresponding parts throughout.

DETAILED DESCRIPTION

Figure 1A:
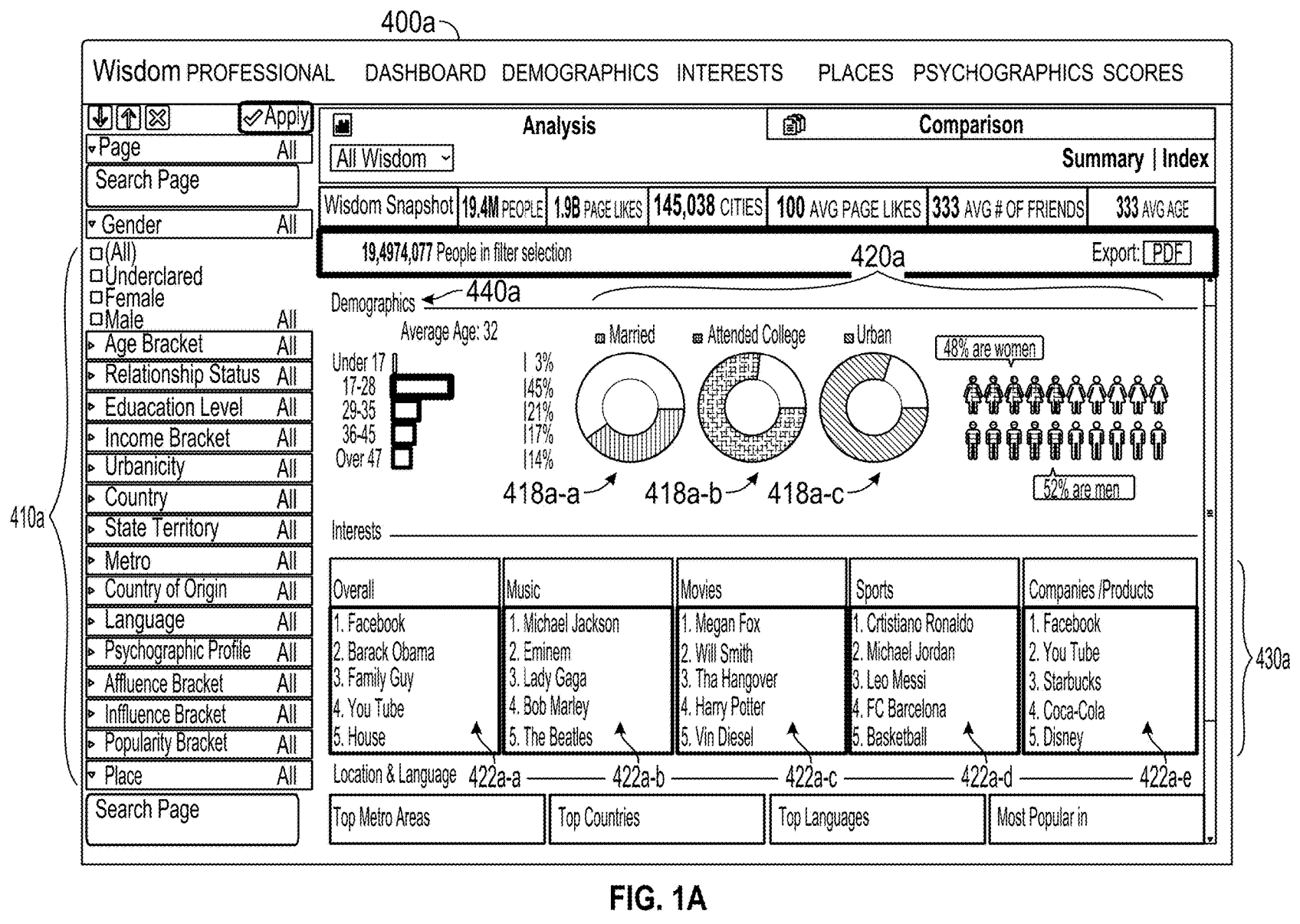
Figure 1B:
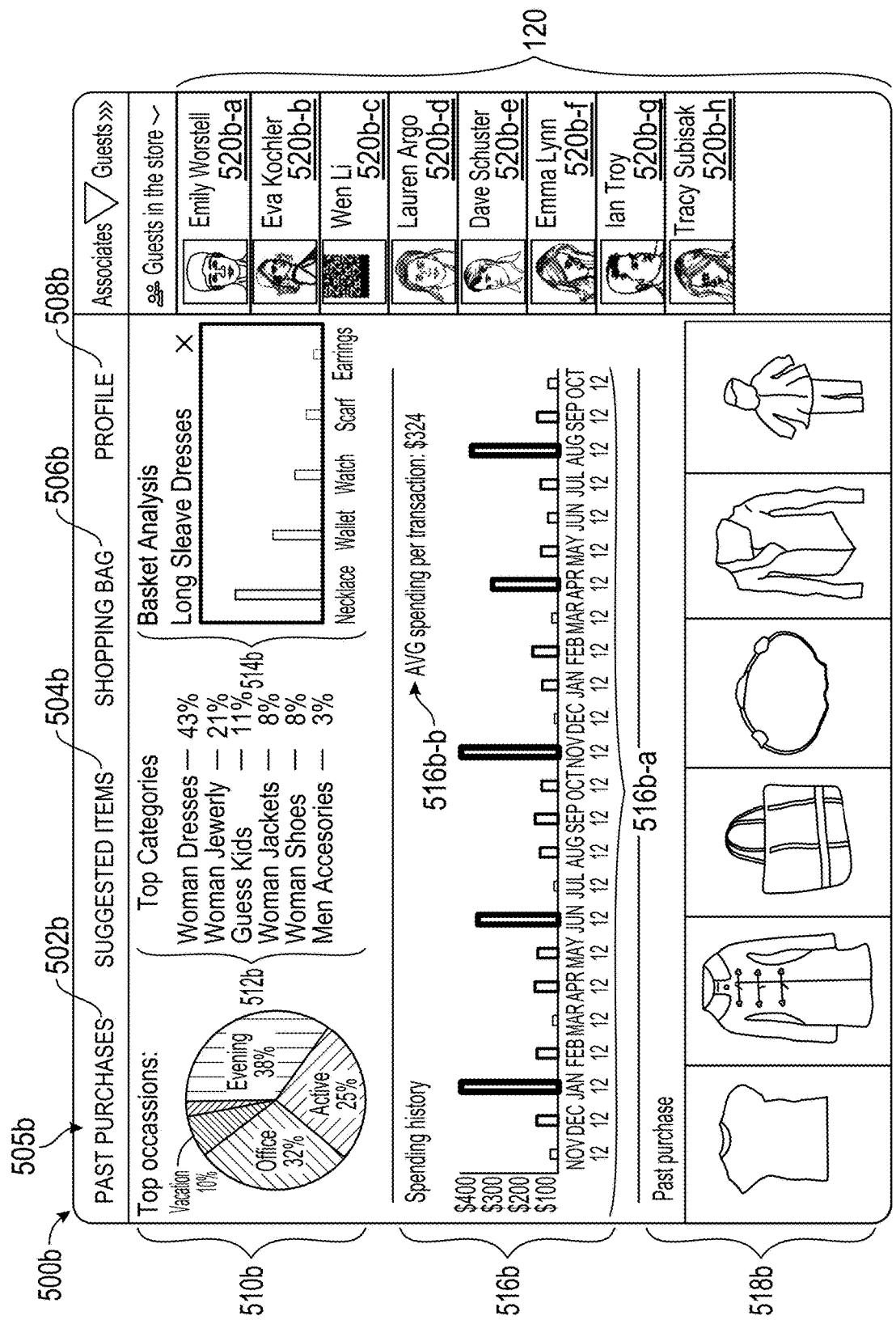

FIG. 1A illustrates an example user interface 400a of a dashboard interface. As shown, interface 400a comprises a plurality of control objects 410a-440a. For example, control objects include grids (e.g., data displayed in table format), graphs, text fields, shapes, etc. that users can use to navigate through the data presented through interface 400a. Interface 400a can be powered by the in-memory analytic data store described throughout this disclosure. In this regard, in some implementations, the analytic data store powers an extensive market intelligence network that provides the data shown in user interface 400a. For example, computer systems implementing the techniques described herein uses information about an application and/or design aspects of dashboard 400a to generate queries to the in-memory data store.

For example, all of the market intelligence data used by and displayed through the intelligence dashboard interface 400a can be loaded into the in-memory analytic data store.

In this example, user interface 400a receives user input defining filter criteria 410a related to the market intelligence information a user seeks. Filter criteria 410a can include demographics data or any other type of data as shown in interface 400a or otherwise available to filter the market intelligence data stored in the in-memory analytic data store. For example, the user may be able to filter the data by gender, age, relationship status, education level, income bracket, urbanicity, etc. A query execution engine (can receive the user input defining filter criteria 410a, and execute queries to access the market intelligence data stored in an in-memory analytic data store. In some examples, the query execution engine can receive the accessed data, perform analytics on the accessed data, and output the results of the analytics to user interface 400a.

As shown in FIG. 1A, the user interface 400a specifies the demographic data used to generate the dashboard output broken down into various categories 420a (e.g., as shown in charts 418a-a, 418a-b, and 418a-c) and outputs ranked lists of interests 422a-a to 422a-e for people that fall within the demographic profile 440a defined by the filter criteria 410a. For example, the categories 420a can include what percentage of the relevant population is married, has attended college, or lives in an urban area. Other types of output and data visualization can be used. In addition, the user interface 400a can receive additional user input to refine or change the filter criteria 410a or the results sought and the user interface 400a can dynamically update in short order given the in-memory data retrieval and processing that occurs responsive to the additional user input.

By way of example, FIG. 1B shows a user interface 500b of an intelligence dashboard also powered by an analytical in-memory data store. Interface 500b displays a customer report 505b to, e.g., a sales associate in a retail store. In an example, the sales associate can view the customer report 505b on a store computer.

In some examples, graphical user interface 500b includes customer portion 520b that displays information indicative of customers who are, e.g., in a particular geographic location (say, the retail store). Customer portion 520b displays customer information 520b-a to 520b-h, with each item of customer information 520b-a to 520b-h representing a customer. A user can select customer information 520b-a to 520b-h by, for example, using a mouse to click on, or using a touch screen display to touch, a desired item of customer information 520b-a to 520b-h. When an item of customer information 520b-a to 520b-h is selected, interface 500 displays information pertaining to the selected customer. In the interface 500, a viewer of graphical user interface 500, e.g., the sales associate, has opted to view information associated with the customer represented by customer information 520a.

A query execution engine can receive the user input, e.g., selection of customer information 520b-a to 520b-h, and execute queries to access the market intelligence data stored in an in-memory analytic data store. In some examples, the query execution engine can receive the accessed data (e.g., data from the in-memory analytic data that complies with the filter criteria 410a), perform analytics on the accessed data, and output the results of the analytics to user interface 500b.

As shown, interface 500b includes past purchases link 502b, selection of which causes interface 500b to display information indicative of past purchases of the customer that is selected via customer portion 520b. Interface 500b also includes suggested items link, selection of which causes interface 500b to display suggestions information 504b indicative of suggested items that a particular customer (e.g., the customer selected from customer portion 520b) may be interested in and want to purchase. Suggestions information 504b can based on analyzing data that is retrieved from an in-memory analytic data store. For example, suggestions information 504b can be based on customers' past purchases. Interface 500b includes shopping bag link 506b, selection of which causes graphical user interface 500b to display items that a particular customer wishes to purchase. Interface 500b includes profile link 508b, selection of which causes interface 500b to be updated to display a customer profile of a particular customer (e.g., the customer selected via currently present customer portion 520b).

Interface 500b includes top occasions portion 510b that displays information (e.g., a graph) indicative of the top occasions for which a particular customer (e.g., customer 520b-a) has purchased merchandise. Information for top occasions portion 510b can be generated based on analytics performed on market intelligence data contained in an in-memory data store. In this example, top occasions portion 510b is generated by tracking past purchases of the customer and then categorizing the types of purchase (e.g., based on various occasions). In another example, top occasions portion 510b displays information indicative of the top occasions for a group of customers, e.g., rather than displaying the top occasions for a particular customer.

Interface 500b also displays top categories information 512b, e.g., information specifying top categories of goods that have been purchased by a particular customer and/or by a group of customers at a retail store. Information for top categories portion 510b can be generated based on analytics performed on market intelligence data pertaining to the particular customer and/or the group of customers contained in an in-memory data store. In some implementations, interface 500b can include basket analysis portion 514b—for display of information indicative of types of goods that are currently in an electronic shopping cart of a customer.

Graphical user interface 500b also includes spending history portion 516b to display information indicative of how much money a particular customer (e.g., the customer selected in portion 520b) has spent with the retailer over a period of time. Information for spending history portion 516b can be generated based on analytics performed on market intelligence data pertaining to the particular customer contained in an in-memory data store. Spending history portion 516b can include a timeline 516b-a, e.g., a representation of the period of time over which spending is tracked. Spending history portion 516b also includes information 516b-b that specifies an average amount of money a particular customer has spent with the retailer over a period of time. Interface 500b also includes portion 518b for display of information indicative of past purchases and/or transactions of a particular customer.

Figure 2:
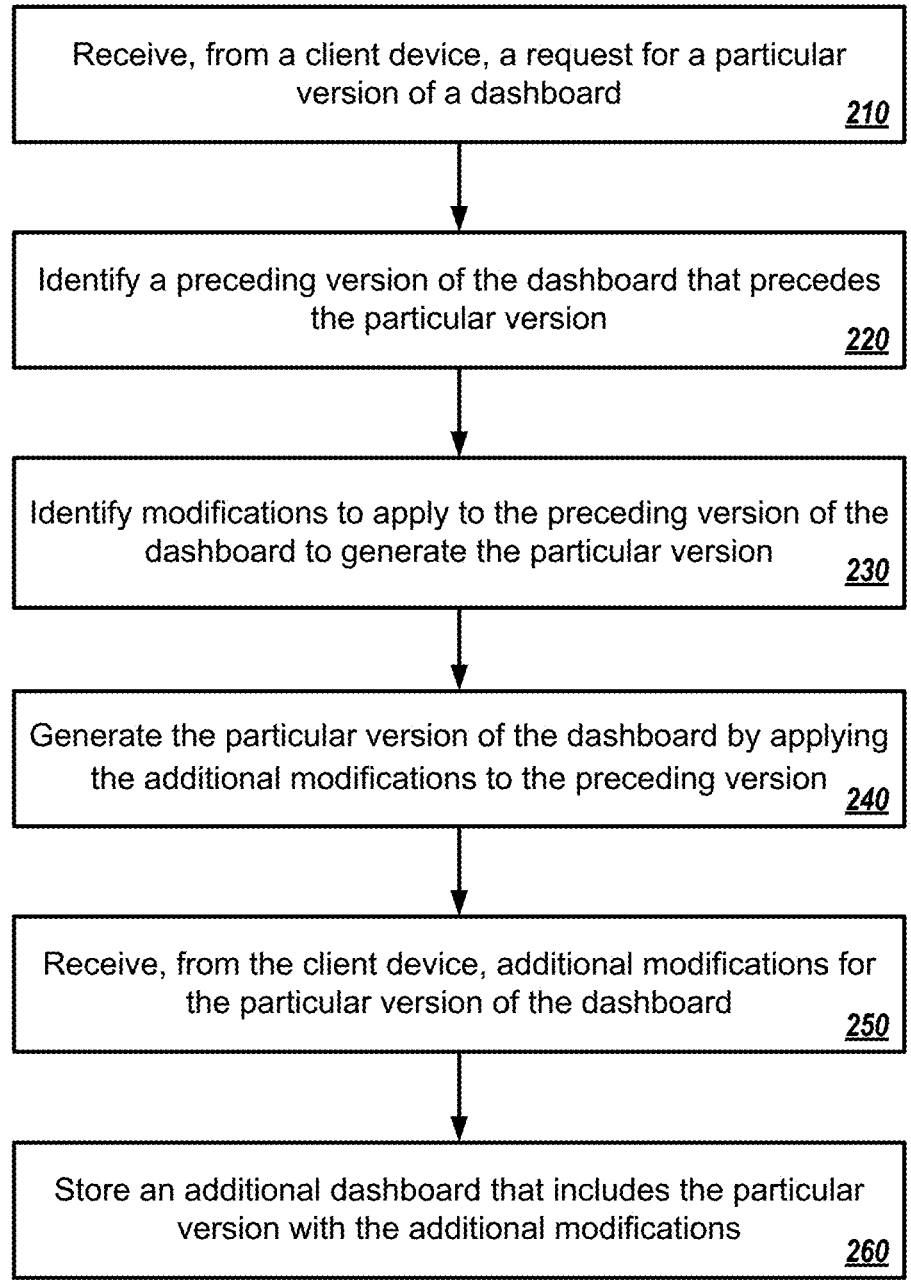
FIG. 2 illustrates an example process for maintaining state while creating a dashboard.

FIG. 2 illustrates an example process 200 for maintaining state while creating a dashboard. In general, the process 200 describes the creation a dashboard for later consumption by an analyst. The operations of the process 200 are described generally as being performed by the server. In some implementations, operations of the process 200 may be performed by one or more processors included in one or more electronic devices. In some implementations, the actions of process 200 may be performed by any users with access to the dashboard. Any changes made by one user will be visible and accessible to other users with the other users access the dashboard.

The system receives, from a client device, a request for a particular version of a dashboard (210). For example, the requested version may be version 2.3, and the system may have access to versions up to and including version 5. In some implementations, the request may come from any user and the system operates on the request in the same way for each user. In some implementations, the client device may be a different client device in later actions of process 200. For example, the client device may be a laptop in one action and in another action the client device may be a tablet device.

The system identifies a preceding version of the dashboard that precedes the particular version (220). In some implementations, the system may not store each version of the dashboard. For example, there may be versions 1, 2, 3 and 4. In the example where the user has requested version 2.3, the system identifies version 2 as the nearest version that precedes the requested version.

The system identifies modifications to apply to the preceding version of the dashboard to generate the particular version (230). In addition to storing full copies of the dashboard for each version, the system also stores the manipulations that users have added on top of each version. Each copy of the version may be associated with a different stack of manipulations. For example, the system may store a stack of manipulations for version 1 and a different stack of manipulations for version 2. Additionally, the manipulations in a stack may map to different versions. For example, the first two manipulations for version two may correspond to version 2.1 and the first five manipulations may correspond to version 2.3.

The system generates the particular version of the dashboard by applying the additional modifications to the preceding version (240). Continuing with the example above, the system applies the manipulations of version 2 to the version 2 dashboard file. The system may not apply all of the manipulations of the stack to the version 2 dashboard, but only those manipulations needed to generate version 2.3. The system provides version 2.3 of the dashboard to the client device.

The system receives, from the client device, additional modifications for the particular version of the dashboard (250). Continuing with the example above, user may interact with version 2.3 of the dashboard and add additional manipulations. In some implementations, the system may add to the manipulations for version 2 of the dashboard.

The system stores an additional dashboard that includes the particular version with the additional modifications (260). In some implementations, the system may create a new version of the dashboard. For example, the system may create a version 5 of the dashboard if the previous highest version of the dashboard was version 4. In this example, the versions need not be sequential. That is, version 4 is not required to have fewer features and content than version 5. In some implementations, the system automatically creates a new version of the dashboard. For example, the system may create the new version after a particular amount of time has passed since the user opened and began updated the dashboard. As another example, the system may create a new version after the user has updated dashboard. In some implementations, the system creates a new version in response to a user request.

In some implementations, the creating user may publish the additional dashboard for an analyst to view and interact with the dashboard. For example, the user may add the additional dashboard to an analyst's library. The analyst may then view and interact with the dashboard in the library. There is no requirement that the user add the highest version or the most detailed version to the analyst's library. For example, the user may add version 1.5 to the analyst's library instead of a later version 4.1. In some implementations, the user may add multiple versions of a dashboard to an analyst's library.

Figure 3:
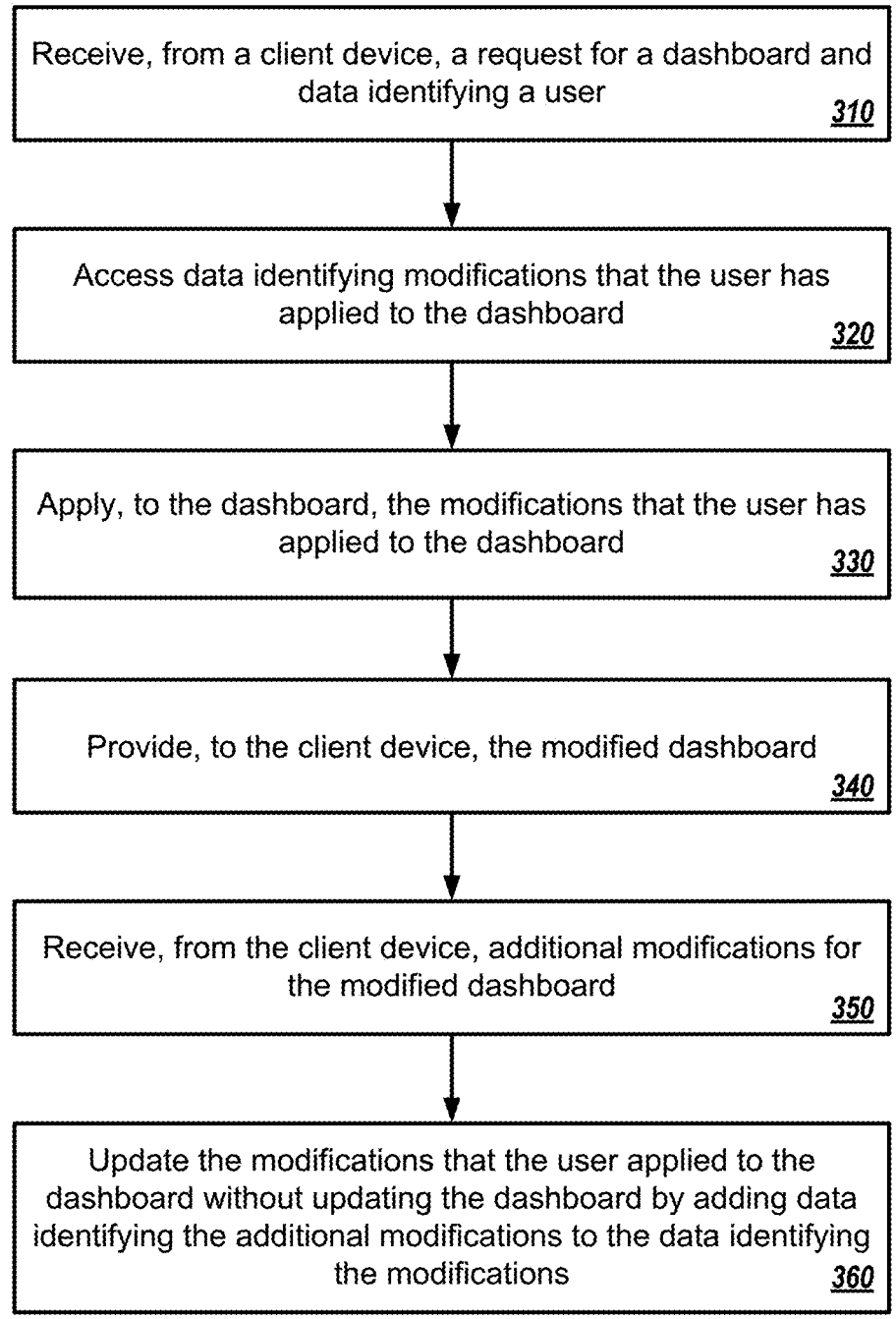
FIG. 3 illustrates an example process for maintaining state while viewing and interacting with a dashboard.

FIG. 3 illustrates an example process 300 for maintaining state while viewing and interacting with a dashboard. In general, the process 300 describes the consumption of a dashboard by an analyst. The operations of the process 300 are described generally as being performed by the server. In some implementations, operations of the process 300 may be performed by one or more processors included in one or more electronic devices. In some implementations, the actions of process 300 are performed by a particular analyst. The actions performed by one analyst may not be viewable by another analyst. The system stores separately the actions and updates performed by each analyst.

The system receives, from a client device, a request for a dashboard and data identifying an analyst (310). The request may be initiated by an analyst who is accessing a dashboard added to the analyst's library. The client device may add data identifying the analyst to the request. In some implementations, the client device may be a different client device in later actions of process 300. For example, the client device may be a laptop in one action and in another action the client device may be a tablet device.

The system accesses data identifying modifications that the analyst has applied to the dashboard (320). The system accesses the dashboard and a link item table. The link item table links to the stack of the modifications that the analyst has added to the dashboard. The modifications may include filters, zooming, rearranging, or similar modifications to the dashboard. For each dashboard, the link item table may link to different stacks of modifications for different users.

The system applies, to the dashboard, the modifications that the analyst has applied to the dashboard (330). The system provides, to the client device, the modified dashboard (340). By applying the modifications, the analyst is able to view the dashboard in the same way as previously viewed. In some implementations, the analyst may request to view the dashboard without requesting the modifications to apply to the dashboard. In this instance, the system accesses the most recent stack of modifications and applies them to the dashboard.

In some implementations, the analyst may request a dashboard with specific modifications. The dashboard with specific modifications may be identified by a bookmark. The analyst may select the bookmark and the system identifies the stack of manipulations that correspond to that bookmark. The bookmark may correspond to a specific point in a stack of manipulations or may correspond to a different stack of manipulations specifically for that particular bookmark.

The system receives, from the client device, additional modifications for the modified dashboard (350). The analyst may perform additional modifications to the modified dashboard. The system updates the modifications that the analyst applied to the dashboard without updating the dashboard by adding data identifying the additional modifications to the data identifying the modifications (360). In some implementations, the system may create a new stack of manipulations that includes the manipulations added to the dashboard and the new manipulations. In this instance, the system may not add to the stack of manipulations used to generated the modified dashboard.

In some implementations, an analyst may share a stack of modifications, or bookmark, with other users. When an analyst shares a bookmark with another analyst, the system may not share access to the original stack of manipulations, but rather create a copy of the stack of manipulations. The system may update the link item table to point to the copy of the stack of manipulations for that particular dashboard.

In some implementations, a user may update the base document of the dashboard. In this instance, the analyst may request to view the dashboard with a corresponding bookmark. If some of the modifications are no longer applicable to the modified dashboard, then the system may not apply the modifications. The modifications may still remain with the stack of manipulations. The system may apply them to a later version of the of the base dashboard if the manipulations are later applicable.

In some implementations, the system may automatically create a new bookmark with the manipulations entered by the analyst. The system may create a new bookmark after the analyst has interacted with the dashboard for a particular amount of time, for example ten minutes. Alternatively, or additionally, the system may create a bookmark after the analyst has entered a particular number of manipulations to the dashboard, for example, three manipulations. Similar to the other bookmarks, the automatically created bookmarks maybe new stacks of manipulations independent from other stacks.

Figure 4:
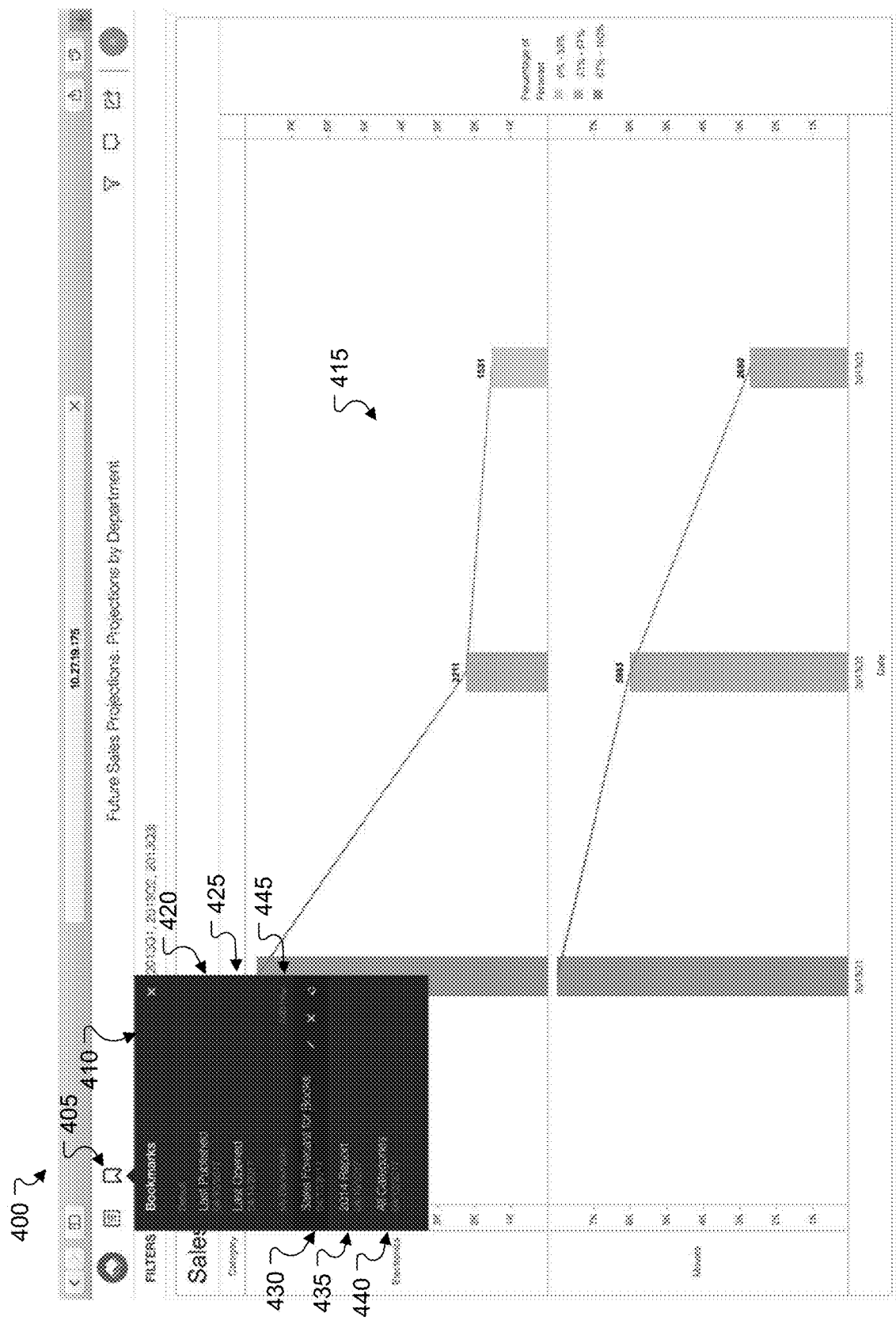
FIGS. 4 and 5 illustrate example interfaces for maintaining state while viewing and interacting with a dashboard.

FIG. 4 illustrates an example interface 400 for maintaining state while viewing and interacting with a dashboard. The interface 400 allows a user to select and open previous bookmarks in addition to creating new bookmarks. The selectable bookmarks include bookmarks that the system saved automatically and bookmarks created by the user.

The interface 400 may be a dashboard or any other type of analytical tool that a user may use to view a graphical representation 415 of raw data. The interface 400 includes a bookmark icon 405 that the user may select to display the bookmark menu 410. The bookmark menu 410 includes bookmarks that represent different states of the graphical representations.

The bookmark menu 410 includes automatically created bookmarks such as bookmarks 420 and 425. Bookmark 420 represents the last published version of the graphical representation 415. The last published version may correspond to the last version of the graphical representation 415 that the user has published for other users to view and interact with. The last published version may include the filters, manipulations, and settings that the user selected when published the corresponding version of the graphical representation 415.

Bookmark 425 represents the last opened version of the graphical representation. Similar to bookmark 420, bookmark 425 represents the last opened version of the graphical representation 415 and the corresponding filters, manipulations, and settings selected by the user.

The bookmark menu 410 also includes user created bookmarks 430, 435, and 440. The user may create bookmarks by selecting the create bookmark icon 445. Upon selecting the create bookmark icon 445, the system saves the filters, manipulations, and settings present in the graphical representation 415. The system then creates an additional user created bookmark in the bookmark menu 410.

The bookmarks 430, 435, and 440 are similar to the automatically created bookmarks in that they each capture the filters, manipulations, and settings present in the graphical representation when the user selected the create bookmark icon 445. The user may also name each of the user created bookmarks to distinguish them from the other bookmarks. In some implementations, upon opening a dashboard, the system may automatically apply the most recent bookmark to the dashboard.

Figure 5:
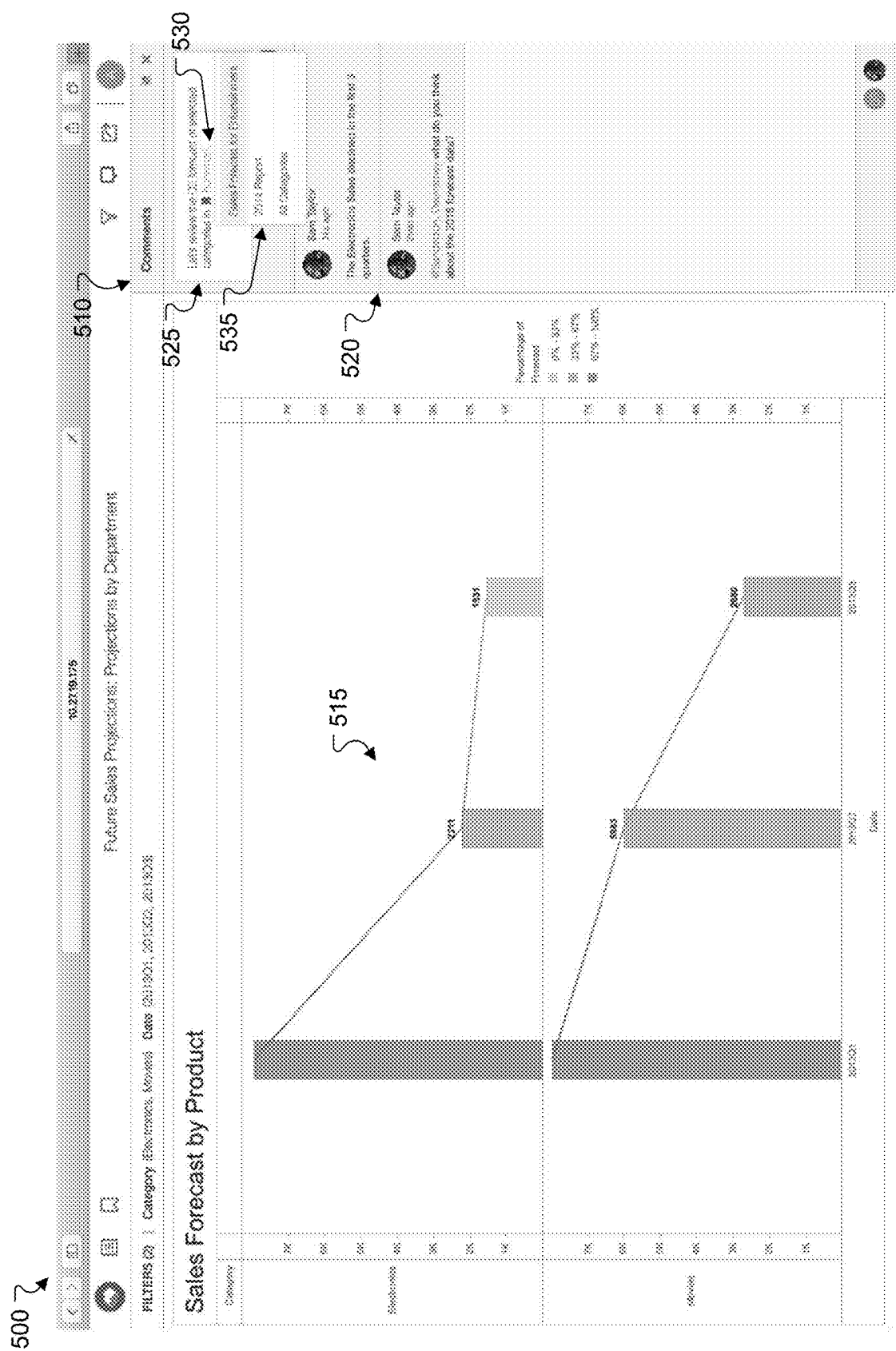

FIG. 5 illustrates an example interface 500 for maintaining state while viewing and interacting with a dashboard. The interface 500 allows a user to share bookmarks that the user has created or that the system has automatically created. The interface 500 may include a chat window 510 where the user can share bookmarks. In some implementations, the user may be able to share bookmarks outside of the interface 500 and outside the application. For example, the user may be able to share bookmarks through an email application, a messaging application, or any application where the user can insert a link to a bookmark.

In the interface 500, the user is viewing graphical representation 515 which may be similar to graphical representation 415. The user has applied various filters, manipulations, and settings to the graphical representation 515. The chat window 510 allows the user to interact with other users to discuss various matters including the graphical representation 515. In the example shown in FIG. 5, the chat window 510 includes messages 520 that the user has exchanged with another user. In message 525, the user inserts a link to a bookmark. To insert a link to a bookmark, the user may select a share icon, type in a keyword such as bookmark, or drag a bookmark from a bookmark menu such as bookmark menu 410. In this instance, the user has typed in a keyword. By typing in the keyword bookmark, the system presents a drop down menu 535 where the user can select the bookmark to share.

The user selects the bookmark to share and the system inserts a link to that particular bookmark. The user sends the message to the other user. The other user receives the message and may select the shared bookmark to view the corresponding graphical representation with the filters, manipulations, and settings selected by the user.

Figure 6:
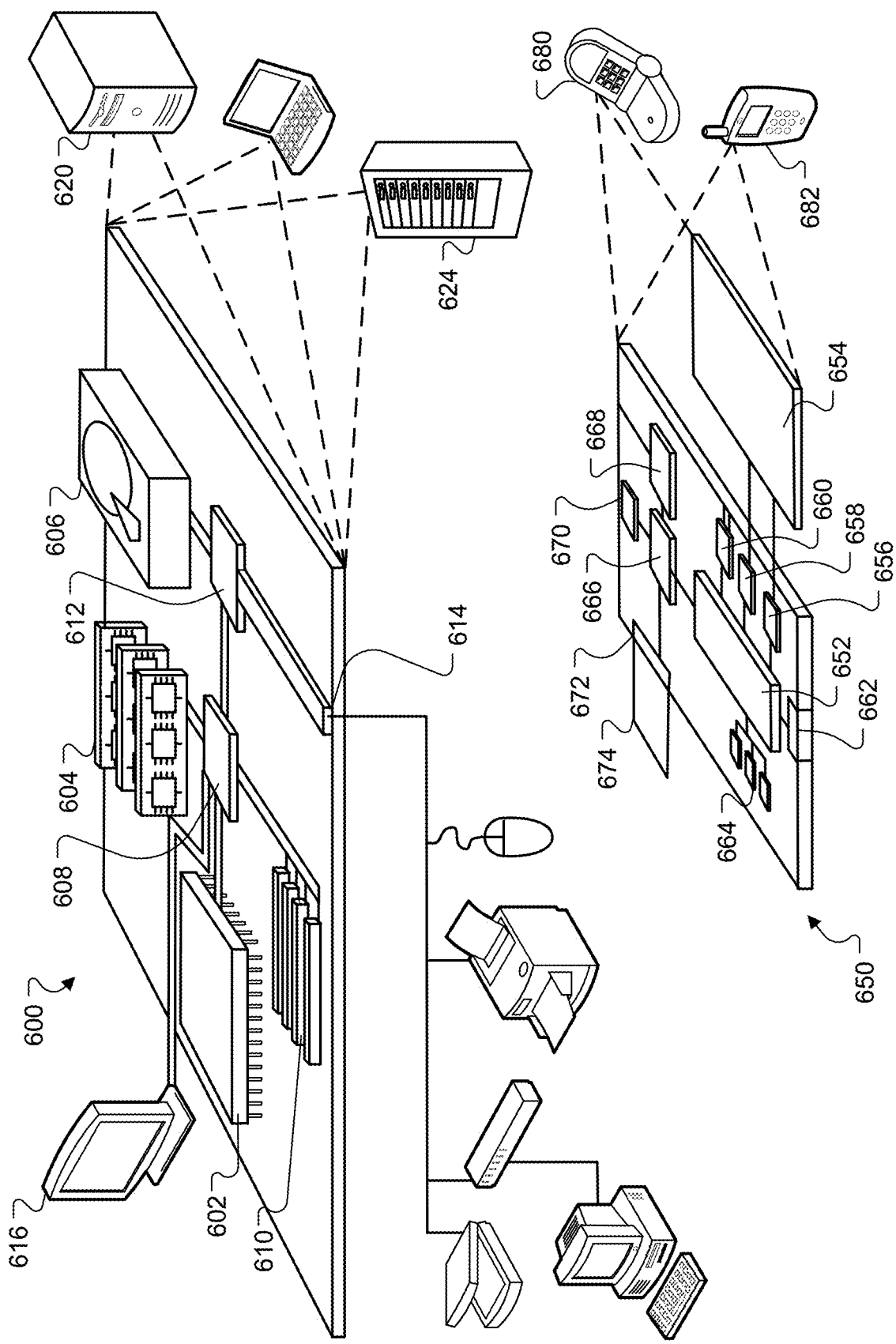
FIG. 6 illustrates an example of a computing device and a mobile computing device.

FIG. 6 shows an example of a computing device 600 and a mobile computing device 650 that can be used to implement the techniques described here. The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 602), perform one or more methods, such as those described above. The instructions can also be stored by one or more storage devices such as computer- or machine-readable mediums (for example, the memory 604, the storage device 606, or memory on the processor 602).

The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which may accept various expansion cards. In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device, such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provided as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 652), perform one or more methods, such as those described above. The instructions can also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth, WiFi, or other such transceiver. In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
storing, by a data analysis system, (i) base dashboard data specifying characteristics of a dashboard for displaying at least one graphical representation of data stored and accessed by the data analysis system, and (ii) a set of user-specific modification data for the dashboard for each of multiple different users, wherein each of the multiple sets of user-specific modification data indicates modifications made by the corresponding user to the dashboard specified by the base dashboard data, and wherein the data analysis system is configured to provide, over a communication network to different devices of the respective users, different versions of the dashboard that respectively incorporate the modifications specified by the user-specific modification data for the respective users with the base dashboard data for the dashboard;
receiving, from a client device of multiple client devices associated with a particular user, and by the data analysis system, (i) a request for the dashboard and (ii) data identifying the particular user;
accessing a stored set of user-specific modification data for the particular user, wherein the accessed set of user-specific modification data for the particular user identifies first modifications that the particular user previously applied to the dashboard;
generating a modified dashboard by applying, to the dashboard specified by the base dashboard data, the first modifications that the particular user previously applied to the dashboard;

in response to receiving the request, providing, to the client device over the communication network, the modified dashboard generated based on the base dashboard data and the first modifications that the particular user previously applied to the dashboard;

after providing the modified dashboard, receiving, from the client device, data indicating additional modifications applied by the user to the modified dashboard; and without updating the base dashboard data specifying characteristics of the dashboard, updating the user-specific modification data for the particular user by adding, to the user-specific modification data for the particular user that identifies the first modifications, data identifying the additional modifications such that the data analysis system is configured to provide a consistent view of the dashboard having the first modifications and the additional modifications to each of the multiple client devices associated with the particular user.

2. The method of claim 1, wherein accessing the stored set of user-specific modification data for the particular user comprises accessing data identifying at least one of:
 filtering applied to the dashboard,
 rearranging elements of the dashboard,
 zooming applied to the elements of the dashboard, or
 selected settings of the dashboard.

3. The method of claim 1, comprising:
 receiving, from the client device, a request to apply a portion of the first modifications that the particular user has previously applied to the dashboard,
 wherein accessing the stored set of user-specific modification data for the particular user comprises accessing the portion of the first modifications, and
 wherein applying, to the dashboard, the first modifications that the particular user has previously applied to the dashboard comprises applying the portion of the first modifications to the dashboard.

4. The method of claim 1, wherein the stored set of user-specific modification comprises a stack of multiple manipulations to the dashboard that were performed by the user.

5. The method of claim 4, wherein adding data identifying the additional modifications to the stored set of user-specific modification data comprises appending, to the stack of multiple manipulations, the data identifying the additional modifications.

6. The method of claim 4, wherein adding data identifying the additional modifications to the stored set of user-specific modification data for the particular user comprises generating an additional stack that includes the multiple manipulations and the additional manipulations.

7. The method of claim 1, wherein applying, to the dashboard, the first modifications that the particular user previously applied to the dashboard comprises:
 determining that a particular modification of the first modifications that the particular user has previously applied to the dashboard is not applicable to the dashboard; and
 applying, to the dashboard, the first modifications other than the particular modification.

8. The method of claim 1, wherein the multiple sets of user-specific modification data for the dashboard specify different states of the dashboard, wherein each set of user-specific modification data for the dashboard indicates modifications to the dashboard to recreate a prior state of the dashboard viewed by the corresponding user.

9. The method of claim 8, wherein, for one or more of the sets of user-specific modification data, the set of user-specific modification data for the dashboard indicates modifications to the dashboard to recreate a state of the dashboard most recently viewed by the corresponding user.

10. The method of claim 1, wherein the client device is a first client device;
 wherein the first modifications specified by the stored set of user-specific modification indicate manipulations of the dashboard that the particular user previously performed using a second client device that is different from the first client device; and
 wherein providing the modified dashboard comprises providing, to the first client device, and based on the data identifying the particular user, a modified dashboard that incorporates the manipulations of the dashboard that the particular user previously performed using the second client device.

11. The method of claim 1, wherein the client device is a first client device;
 wherein the first modifications indicate manipulations to the dashboard by the particular user that caused the dashboard to appear in a particular state on a second client device that is different from the first client device; and
 wherein providing the modified dashboard comprises providing, to the first client device, and based on the data identifying the particular user, a modified dashboard configured to appear in the particular state that previously appeared on the second client device.

12. The method of claim 1, wherein the updating is performed in response to receiving data indicating a user input requesting to save a current state of the dashboard presented by the client device.

13. The method of claim 1, wherein the updating is performed automatically by the data analysis system.

14. The method of claim 13, wherein the updating is performed automatically in response to determining that a particular amount of time has elapsed or in response to determining that a particular number of manipulations to the dashboard have been made.

15. The method of claim 1, comprising:
 receiving data indicating user input requesting to share a dashboard that is in a particular state at the client device with a second user;
 in response to receiving the data indicating the user input:
  creating a copy of a stack of manipulations for the particular user that represents modifications to the dashboard to obtain the particular state of the dashboard; and
  providing a reference to the copy of the stack of manipulations.

16. The method of claim 1, wherein storing, by the data analysis system, the base dashboard data comprises storing dashboard data configured to generate a visualization of data from a database, the method comprising:
 accessing the stored set of user-specific modification data for the particular user, wherein the accessed set of user-specific modification data for the particular user identifies first modifications that include a filter setting; and
 generating the modified dashboard by generating the visualization of the data from the database based on the filter setting.

17. A system comprising:
 one or more processors; and one or more non-transitory machine-readable media storing instructions that are operable, when executed by the one or more processors, to cause the system to perform operations comprising:
- storing (i) base dashboard data specifying characteristics of a dashboard for displaying at least one graphical representation of data, and (ii) a set of user-specific modification data for the dashboard for each of multiple different users, wherein each of the multiple sets of user-specific modification data indicates modifications made by the corresponding user to the dashboard specified by the base dashboard data, and wherein the system is configured to provide, over a communication network to different devices of the respective users, different versions of the dashboard that respectively incorporate the modifications specified by the user-specific modification data for the respective users with the base dashboard data for the dashboard;
- receiving, from a client device of multiple client devices associated with a particular user, (i) a request for the dashboard and (ii) data identifying the particular user;
- accessing a stored set of user-specific modification data for a particular user, wherein the accessed set of user-specific modification data for the particular user identifies first modifications that the particular user previously applied to the dashboard;
- generating a modified dashboard by applying, to the dashboard specified by the base dashboard data, the first modifications that the particular user previously applied to the dashboard;
- in response to receiving the request, providing, to the client device over the communication network, the modified dashboard generated based on the base dashboard data and the first modifications that the particular user previously applied to the dashboard;
- after providing the modified dashboard, receiving, from the client device, data indicating additional modifications applied by the user to the modified dashboard; and
- without updating the base dashboard data specifying characteristics of the dashboard, updating the user-specific modification data for the particular user by adding, to the user-specific modification data for the particular user that identifies the first modifications, data identifying the additional modifications such that the system is configured to provide a consistent view of the dashboard having the first modifications and the additional modifications to each of the multiple client devices associated with the particular user.

18. The system of claim 17, wherein accessing the stored set of user-specific modification data for the particular user comprises accessing data identifying at least one of:
filtering applied to the dashboard,
rearranging elements of the dashboard,
zooming applied to the elements of the dashboard, or
selected settings of the dashboard.

19. The system of claim 17, wherein the stored set of user-specific modification comprises a stack of multiple manipulations to the dashboard that were performed by the user.

20. One or more non-transitory computer-readable media storing software comprising instructions executable by one or more computers which, upon such execution, cause the one or more computers to perform operations comprising:
- storing (i) base dashboard data specifying characteristics of a dashboard for displaying at least one graphical representation of data, and (ii) a set of user-specific modification data for the dashboard for each of multiple different users, wherein each of the multiple sets of user-specific modification data indicates modifications made by the corresponding user to the dashboard specified by the base dashboard data, and wherein the one or more computers are configured to provide, over a communication network to different devices of the respective users, different versions of the dashboard that respectively incorporate the modifications specified by the user-specific modification data for the respective users with the base dashboard data for the dashboard;
- receiving, from a client device of multiple client devices associated with a particular user, (i) a request for the dashboard and (ii) data identifying the particular user;
- accessing a stored set of user-specific modification data for a particular user, wherein the accessed set of user-specific modification data for the particular user identifies first modifications that the particular user previously applied to the dashboard;
- generating a modified dashboard by applying, to the dashboard specified by the base dashboard data, the first modifications that the particular user previously applied to the dashboard;
- in response to receiving the request, providing, to the client device over the communication network, the modified dashboard generated based on the base dashboard data and the first modifications that the particular user previously applied to the dashboard;
- after providing the modified dashboard, receiving, from the client device, data indicating additional modifications applied by the user to the modified dashboard; and
- without updating the base dashboard data specifying characteristics of the dashboard, updating the user-specific modification data for the particular user by adding, to the user-specific modification data for the particular user that identifies the first modifications, data identifying the additional modifications such that the one or more computers are configured to provide a consistent view of the dashboard having the first modifications and the additional modifications to each of the multiple client devices associated with the particular user.

* * * * *